INVENTOR.
TROY D. GRAYBEAL
BY
ATTORNEYS.

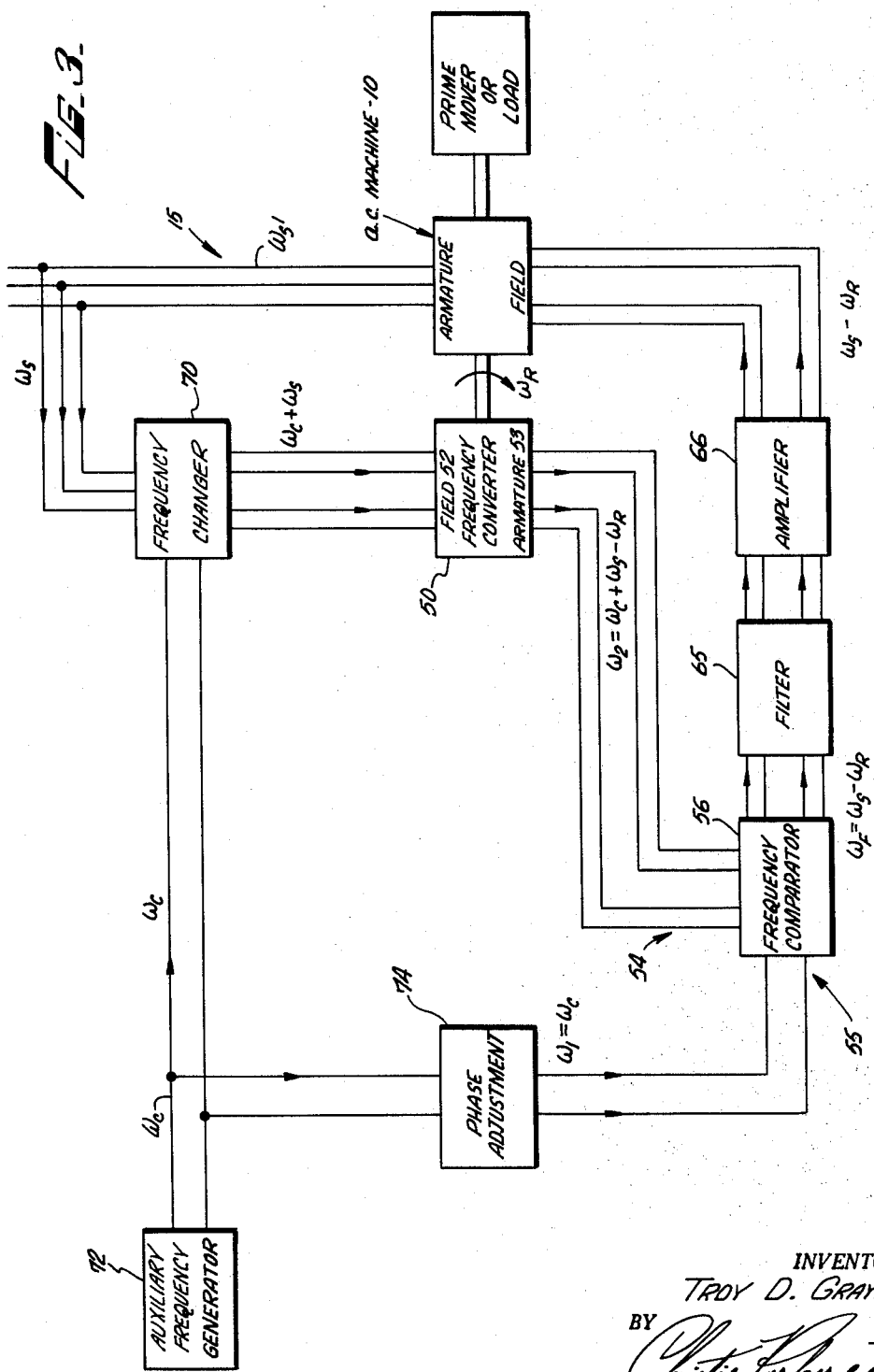

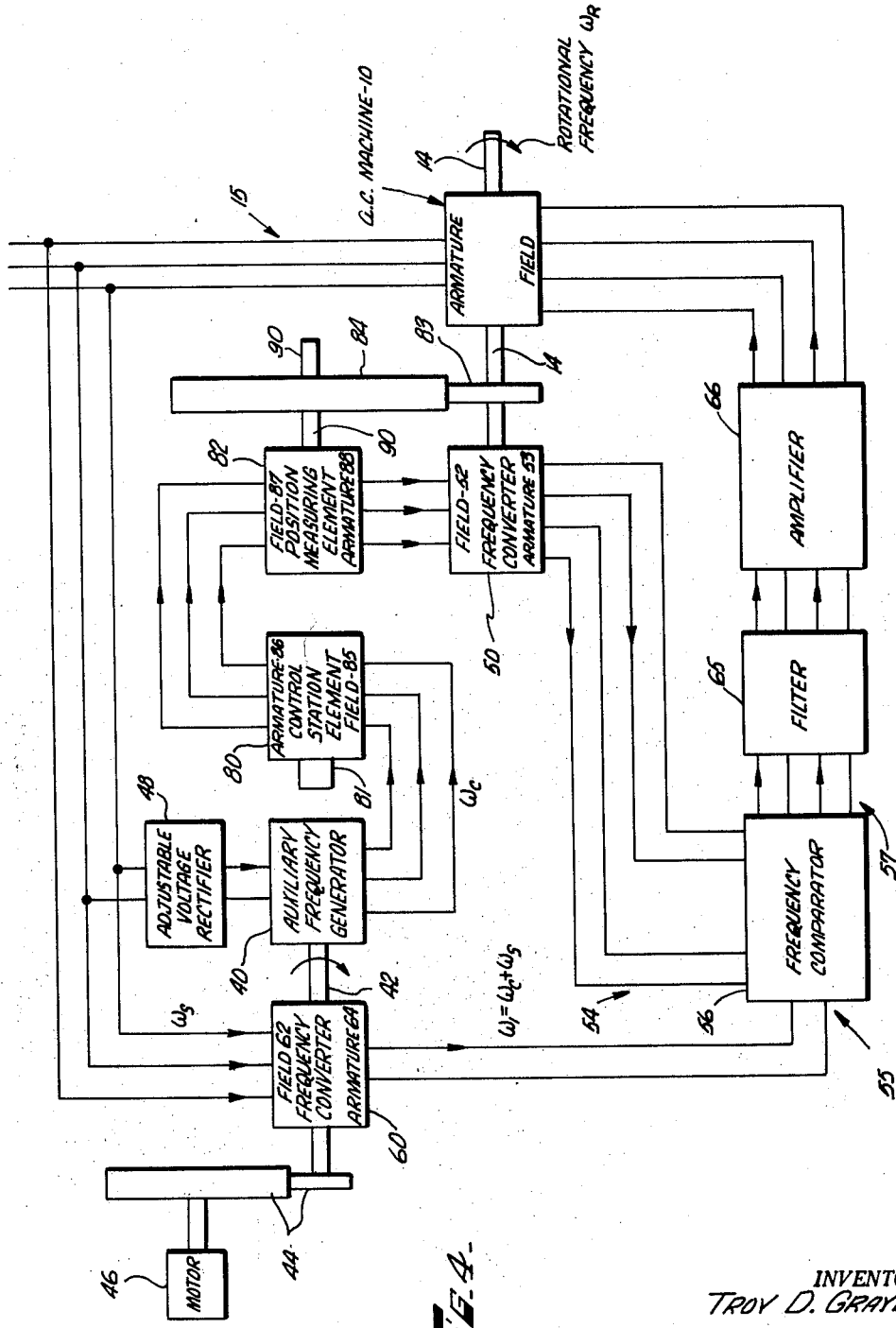

United States Patent Office 3,144,594
Patented Aug. 11, 1964

3,144,594
CONTROL APPARATUS FOR ALTERNATING CURRENT DYNAMOELECTRIC MACHINES
Troy D. Graybeal, Anaheim, Calif., assignor to Lear Siegler, Inc., a corporation of Delaware
Filed Feb. 27, 1961, Ser. No. 91,925
19 Claims. (Cl. 318—197)

The present invention relates to apparatus for controlling alternating current dynamoelectric machines and more particularly to an apparatus for controlling the excitation of such machines.

Control systems for alternating current (A.C.) dynamoelectric machines are known in which the shaft speed (in motor applications) or the frequency of the alternating current output (in generator applications) is controlled by applying A.C. excitation to the field windings to control the direction and speed of rotation of the magnetic field for the armature. In such systems the rotating magnetic flux for the armature is made up of two components: (1) the direction and speed of the mechanical rotation of the field windings relative to the armature and (2) the phase and frequency of the A.C. voltage applied to the field windings. The A.C. machines utilized in such systems are generally constructed with a non-salient pole field and armature structure.

Controlled flux A.C. excited induction machines are very useful in producing controlled frequency alternating current regardless of shaft speed variations (in generator applications) and also for providing accurate control of the speed, torque or horse power output of an A.C. motor. Whether an A.C. machine operates as a generator or as a motor is determined by the phase angle between the armature current and the field current or rotating magnetic flux.

In systems for controlling the field excitation of an A.C. excited machine it is necessary to provide a field excitation voltage or current which has a frequency equal to the difference between the frequency of the current in the stator and the rotational frequency of the machine. The rotational frequency of the machine is equal to the speed of rotation of the rotor in revolutions per second, times the number of pairs of poles for which the machine is wound. The difference between the frequency of the current in the armature or stator and the rotational frequency is generally referred to as the slip frequency because it is always equal to the armature frequency times the slip, where the slip is expressed as a per unit value and is equal to the difference between the synchronous speed and the actual speed divided by the synchronous speed. Control apparatus for providing such A.C. excitation to dynamoelectric machines is disclosed in the copending application of Troy D. Graybeal and Charles Philip Cardeiro, Serial No. 81,389, filed January 9, 1961, entitled "Control Apparatus For Alternating Current Dynamoelectric Machines," and assigned to the assignee of the present invention.

In order to derive an excitation signal having the desired slip frequency, two items of information must be utilized, e.g. the frequency of the current in the armature of the A.C. machine and the rotational frequency of the shaft or rotor of the A.C. machine. In conventional prior art systems, two signals representative of the above information are combined in either; (1) a special commutator type machine commonly referred to as a frequency converter, or (2) an electronic demodulator to extract the difference or "beat" frequency. See, for example, French Patent No. 604,033, published in 1926, and U.S. Patent 2,845,617, which was granted to L. J. Johnson in 1958.

The commutator type frequency converter is inherently limited to comparatively low slip frequencies at reasonably high power levels due to commutation problems. As a result, such commutator type frequency converters are useful only for a relatively small range of speeds of an A.C. machine having an appreciable power output. An electronic or static rectifier type of demodulator has two inherent disadvantages. First, such a demodulator provides in the output not only the difference frequency between the two input frequencies, but also the sum of the two input frequencies and combinations of the multiples of the two input frequencies. Thus the output of such an electronic demodulator must be filtered to remove the unwanted frequencies which are produced. The most difficult component for the filter to remove is generally the sum component since it is usually larger in magnitude as well as closer in frequency to the desired difference frequency signal. Both of these factors limit the frequency range of excitation signals that can be satisfactorily produced and thus limit the speed range of the controlled A.C. machine. For an electronic type demodulator a slip frequency equal to about 20% of the frequency of the armature current may be the upper limit.

Where it is desired to control an A.C. machine over a large speed range wherein the slip frequency is comparable with the armature current frequency, some means other than the conventional prior art apparatus must be employed to derive the slip frequency excitation signals.

To overcome some of the problems inherent in the commutator type and electronic type demodulators a modulated carrier system has been suggested in the prior art. See, for example, an article entitled "Synchronous Flux Generator," by O. J. M. Smith in Electrical Engineering, vol. 77, pages 605–610, July 1958. This amplitude modulated carrier system will be discussed in more detail later. It is sufficient here to point out that an amplitude modulated carrier system solves some of the problems of the conventional prior art systems but in turn introduces additional problems such as slow speed of response and poor amplitude regulation of the excitation voltage.

The above disadvantages of the prior art apparatus for providing slip frequency excitation to control the direction and speed of rotation of the magnetic field for an A.C. machine have been overcome by the present invention.

In accordance with the present invention, an efficient and highly accurate apparatus is provided for deriving the slip frequency excitation for an A.C. machine having an armature and a polyphase field winding. The apparatus includes a source of control signals and means for producing an auxiliary frequency signal similar to a carrier signal. Control means are coupled between the source of control signals, the means for producing the auxiliary frequency signal and the A.C. machine for producing first and second alternating current amplitude unmodulated command signals wherein the command signals have a difference frequency representative of the slip frequency of the A.C. machine and wherein each of the command signals includes the auxiliary frequency signal as one component thereof so that the auxiliary frequency signal cancels out when the algebraic difference of the command signals is obtained.

The apparatus further includes means for obtaining the algebraic difference between the first and second command signals to provide a polyphase slip frequency excitation signal and means for applying the excitation signal to the field windings of the A.C. machine. The invention is described in more detail in reference to the accompanying drawings in which:

FIG. 3 is a block diagram of a modification of the apparatus of FIG. 2; and

FIG. 4 is a block diagram of another embodiment of the present invention.

Figure 1:
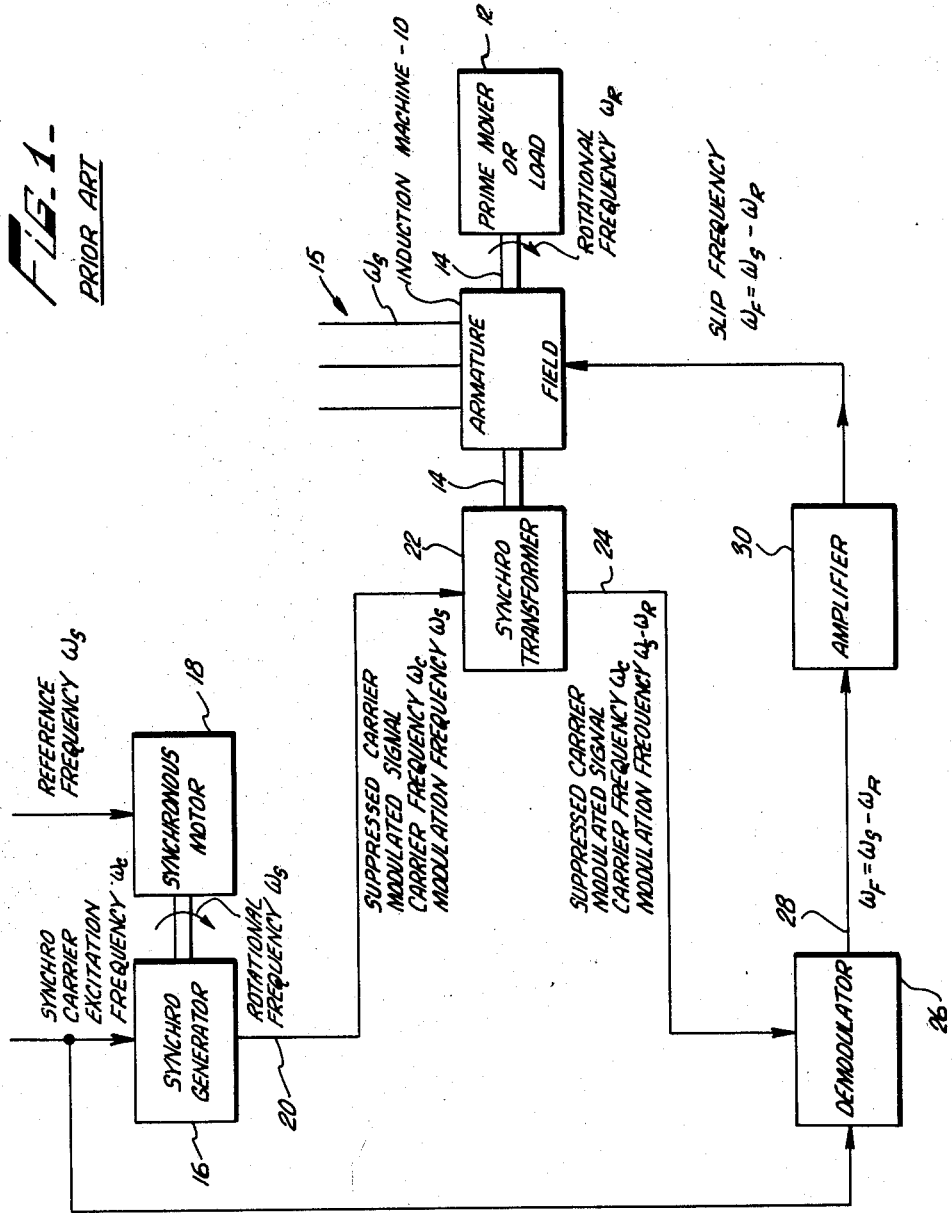
FIG. 1 is a block diagram of a prior art apparatus for deriving slip frequency excitation for an A.C. machine.

Referring now to the drawings wherein like parts are designated by the same reference numerals throughout the several figures and more particularly to FIG. 1 there is illustrated a prior art modulated carrier system for controlling the A.C. field applied to a dynamoelectric or induction machine 10. The machine 10 may be constructed similar to an induction motor with the field windings wound on the rotor and connected to conventional slip rings (not shown) for external excitation as will be more fully explained. The armature windings (not shown) of the machine 10 may be wound on the stator in a conventional manner. The machine 10 is connected to a prime mover or load 12 by means of a shaft 14. If the machine 10 is operating as a generator, a prime mover is utilized to drive the rotor and if the machine 10 is controlled to operate as a motor a load is connected to the shaft 14.

The armature of the machine 10 is connected to a transmission line 15 which receives power from or supplies power to the machine 10 depending upon its operation. A synchro generator 16 is driven by a synchronous motor 18 which is supplied with an alternating current having a predetermined reference frequency designated by $\omega_S$. The reference frequency may be equal to the frequency of the current in the transmission line 15. Thus the synchronous motor 18 is driven at a constant speed which is representative of the reference frequency $\omega_S$. The synchro generator is supplied with a single phase synchro carrier excitation signal having a frequency $\omega_C$. The output 20 of the synchro generator 16 is in the form of a suppressed carrier amplitude modulated signal wherein the carrier frequency is $\omega_C$ and the modulation frequency is $\omega_S$. This suppressed carrier modulated signal is supplied to one winding of a conventional synchro transformer 22 which is connected to the shaft 14 to be driven by the A.C. machine 10. The synchro transformer 22 converts the suppressed carrier modulated signal to another suppressed carrier modulated signal in the output circuit 24 thereof wherein the carrier frequency remains unchanged and the modulation frequency is changed to the difference between the reference frequency $\omega_S$ and a speed frequency $\omega_R$ representative of the rotational frequency of the machine 10.

The suppressed carrier modulated output signal from the synchro transformer 22 is supplied to one input of an electronic or mechanical phase-sensitive demodulator 26. The single phase carrier frequency $\omega_C$ is supplied to another input of the demodulator 26 for extracting the modulation signal which has a frequency equal to the difference between the reference frequency $\omega_S$ and the speed frequency $\omega_R$ of the machine 10. The output from the demodulator 26 is amplified by an amplifier 30 and applied to the field windings of the induction machine 10 as shown.

This prior art system has two inherent disadvantages. First one channel of the signal information which is eventually applied to the field windings of the induction machine 10 is carried by the amplitude of the modulation of the suppressed carrier signal. For this reason the signal information is affected by voltage changes in the synchro generator excitation supply which must be carefully regulated if accuracy of the system is to be obtained. Second, one input (or the output) of each synchro in the system is a mechanical signal and an electro-mechanical transducer (such as the synchronous motor 18) is required for each synchro for which electrical signals are to be utilized. For this reason the overall dynamic response of the system is critically dependent upon the electro-mechanical dynamic characteristic of each synchro element in the system. Generally the dynamic response of electro-mechanical elements is quite slow as compared to the response of electric elements. As a result, such prior art synchro systems are limited to applications where the overall dynamic response is comparatively slow.

Figure 2:
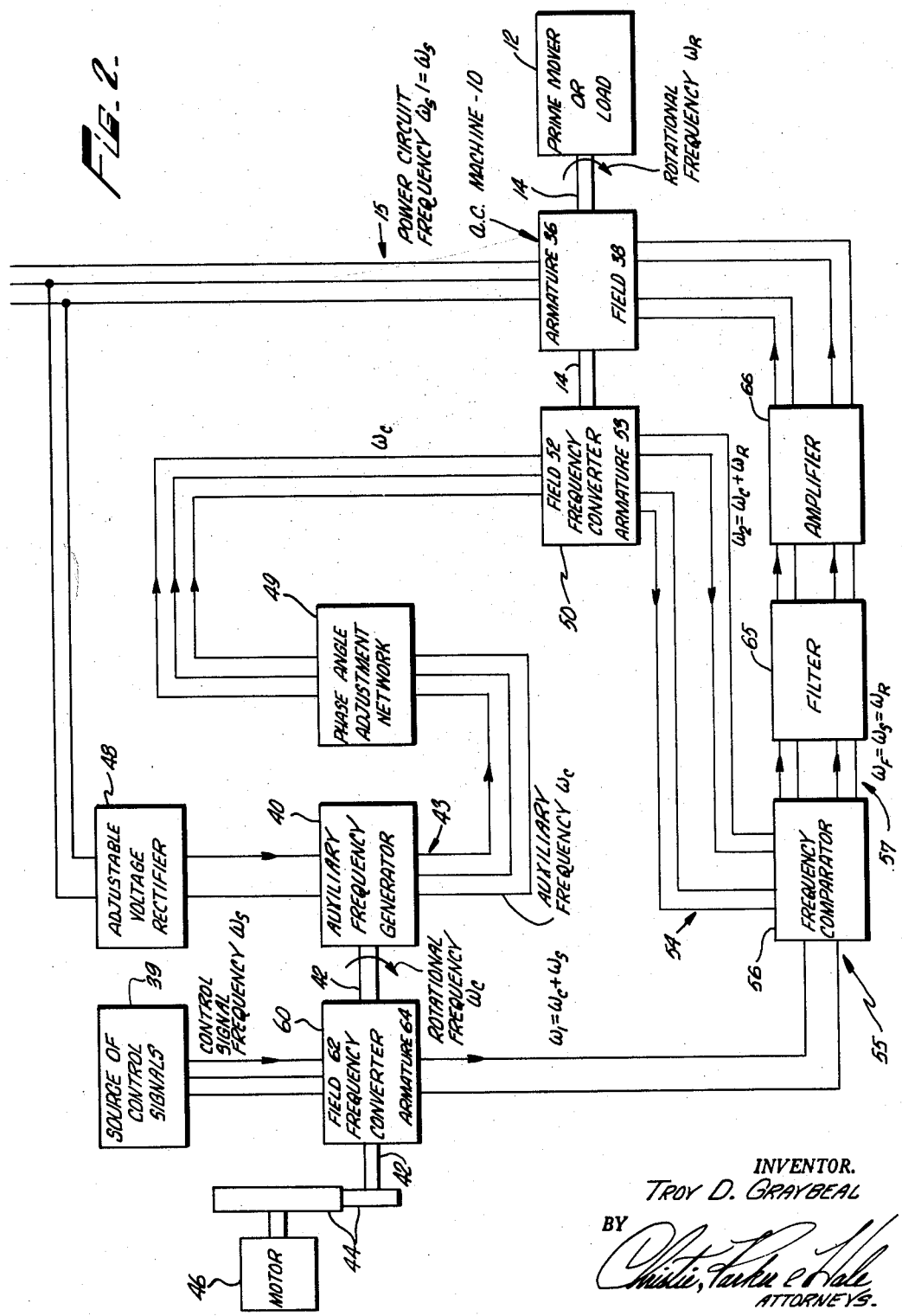
FIG. 2 is a block diagram of an apparatus in accordance with the present invention.

The disadvantages of the above prior art suppressed carrier amplitude modulated signal system are overcome by the present invention which is illustrated in FIG. 2. Referring now to FIG. 2, an A.C. machine 10 is provided with an armature 36 and polyphase field windings 38. The armature 36 is connected to a suitable transmission line 15 for supplying power to or receiving power from the line depending upon the operation of the machine 10.

A source of control signals 39 having a frequency $\omega_S$ is provided for controlling the excitation of the A.C. machine 10 as will be more fully explained. The source of control signals 39 may be an electronic oscillator where the output frequency of the machine 10 is to be controlled. Where the A.C. machine 10 is operating as a motor an external source of energizing potential connected to the transmission line 15 may be utilized to supply the control signals. A polyphase auxiliary frequency signal generator 40 is coupled through a shaft 42 and a pair of gears 44 to a suitable prime mover or motor 46 for supplying a polyphase auxiliary high frequency signal having a frequency $\omega_C$. The auxiliary frequency signal generator 40 may be similar to a synchronous generator wherein the field winding is energized by direct current through an adjustable voltage rectifier 48 which may be connected to the transmission line 15 as shown. The adjustable voltage rectifier 48 controls the magnitude of the magnetic field for the auxiliary frequency generator 40 and therefore controls the amplitude of the three phase auxiliary frequency signal produced in the output circuit 43 of the carrier generator 40.

The polyphase auxiliary frequency signal output from the generator 40 is applied to a polyphase (three phase) field winding 52 of a frequency converter 50 through a phase shifting transformer or a phase angle adjustment network 49 which controls the time phase relationship of the auxiliary frequency signal applied to the frequency converter 50. Such phase angle adjustment networks are well known in the art and may be responsive to a manual control or an electrical signal for adjusting the time phase relationship between the input and output A.C. signal. The frequency converter 50 is in the form of an induction machine similar to the machine 10 and has a polyphase (two phase) armature 53. The frequency converter 50 is coupled to the shaft 14 of the A.C. machine 10 for rotation therewith. As a result the rotor of the frequency converter 50 rotates at a speed representative of the rotational frequency $\omega_R$ of the A.C. machine 10. The field winding 52 may be secured to the rotor of the frequency converter 50 and the rotor may be arranged to rotate in the opposite direction of the rotating magnetic field set up by the auxiliary frequency signal excitation of the field winding 52. This induces a second command signal in the armature 53 which has a frequency $\omega_2$ equal to the sum of the auxiliary frequency $\omega_C$ and the rotational frequency $\omega_R$ of the A.C. machine 10. In mathematical terms $\omega_2 = \omega_C + \omega_R$. The output signal from the frequency converter 50 (second command signal) is an amplitude unmodulated polyphase signal and is illustrated as a two phase signal.

The armature output from the frequency converter 50 is applied to one input circuit 54 of a frequency comparator 56. Another input circuit 55 of the frequency comparator 56 is supplied with a first amplitude unmodulated command signal having a frequency $\omega_1$ which is equal to the sum of the auxiliary frequency $\omega_C$ and the reference frequency $\omega_S$ of the control signals. The first command signal having a frequency $\omega_1$ is obtained by means of a second frequency converter 60 which is coupled to a shaft 42 of the auxiliary frequency signal generator 40 and provided with a polyphase field winding 62 which is connected to the source of control signals 39 as shown. The armature winding 64 of the frequency converter 60 may be polyphase or single phase as shown. The rotor of the frequency converter 60 is coupled to the auxiliary frequency signal generator 40 and therefore rotates at a speed representative of the frequency $\omega_C$ of the auxiliary frequency signal. Either the field 62 or the armature 64 of the frequency converter 60 may be mounted on the rotor.

The frequency converter 60 adds the speed of the rotor to the rotating magnetic field set up in the field by the source of control signals having a frequency $\omega_S$. As a result the output from the armature 64 of the frequency converter 60 has a frequency which is equal to the sum of auxiliary frequency $\omega_C$ and the control signal frequency $\omega_S$. In mathematical terms $\omega_1 = \omega_C + \omega_S$.

The frequency comparator 56 which may be a conventional mechanical or electronic phase sensitive demodulator, derives the algebraic difference between the first and second command signals and produces a polyphase regulating signal across an output circuit 57 which has a frequency $\omega_F$ equal to the difference frequency of the first and second command signals. In mathematical terms, $\omega_F = \omega_1 - \omega_2 = \omega_S - \omega_R$. This frequency $\omega_F$ is representative (or in this case equal) to the slip frequency of the A.C. machine 10. The regulating or slip frequency signal output from the frequency comparator 56 is filtered by means of a suitable filter 65 to eliminate signals having undesired frequencies and then applied to the polyphase field winding 42 of the A.C. machine 10 through a suitable amplifier 66 which may include one or more exciters and compensation circuits as is described in the copending application referred to above.

The apparatus of FIG. 2 is essentially free from all the limitations discussed in connection with the apparatus of FIG. 1. For example, the signal information which controls the amplitude and time phase relationship of the regulating signal and therefore the field excitation of the machine is carried by the amplitude and phase of the first and second command signals in the apparatus of FIG. 1. See FIG. 2. The amplitude of the unmodulated auxiliary frequency signal and the first and second command signals may be easily regulated by well known means to accurately control the magnitude of the excitation to the A.C. machine 10 and thereby accurately control the power factor at which the machine operates. The time phase relationship of the field excitation for the machine 10 may be conveniently controlled by the network 49 to control the power output of the machine 50.

The apparatus of FIG. 2 does not utilize any electromechanical transducers for converting electric signals to mechanical signals and then back to electrical signals. In the apparatus of FIG. 1 the synchronous motor 18 and synchronous generator 16 function as electro-mechanical transducers to provide the modulation signal which controls the excitation of the A.C. machine. The apparatus of FIG. 2 employs only one electro-mechanical transducer (frequency converter 50) which affects the slip frequency excitation signal output from the frequency comparator 56. This electro-mechanical transducer is essential since the speed of the shaft 14 must be converted into an electrical signal. The operation of the apparatus of FIG. 2 is independent of the phase and frequency of the auxiliary frequency signal since it cancels out in the frequency comparator 56. Thus the speed of the motor 46, the frequency converter 60 and the auxiliary frequency signal generator 40 does not have to be closely controlled as is true of the case with the speed of the synchronous motor 18 in the apparatus of FIG. 1. As a result the apparatus of FIG. 2 exhibits a much higher speed of response than the apparatus of FIG. 1 with respect to disturbances or changes in the reference frequency or line frequency $\omega_S$ or other disturbances which affect the loading on the small synchronous motor 18 of FIG. 1.

The prior art apparatus of FIG. 1 is also limited to the use of a carrier frequency $\omega_C$ which is high compared to the reference frequency $\omega_S$. The synchro generator 16 does not produce a true suppressed carrier modulated wave in its output since the two side bands are not equal. The magnitude of each of the side bands is directly proportional to the speed of the revolving magnetic field component which produces it. Thus the lower side band frequency component has a magnitude proportional to $\omega_C - \omega_S$ and the upper side band frequency component has a magnitude proportional to $\omega_C + \omega_S$. The lower side band disappears when $\omega_C = \omega_S$. The signal output from the demodulator 26 in FIG. 1 decreases with an increasing reference frequency $\omega_S$ (corresponding to a higher speed of the synchro generator 16) and contains additional modulation products that must be filtered out. The apparatus of the present invention as illustrated in FIG. 2 is free from this effect since only one side band is employed. As a result the apparatus of the present invention is operable even though the control signal frequency $\omega_S$ is equal to or greater than the auxiliary frequency $\omega_C$.

The apparatus of FIG. 2 provides additional advantages over the conventional prior art systems for supplying A.C. excitation to an A.C. machine. The apparatus of FIG. 2 is capable of controlling the excitation of the A.C. machine 10 through zero speed which is impossible in many prior art systems where a tachometer is utilized to provide a shaft speed reference signal. The apparatus of FIG. 2 further provides an output signal from the frequency comparator 56 in which the modulation products are easily filtered out since the sum of the input signals thereto have a frequency equal to $2\omega_C + \omega_S + \omega_R$. This sum frequency is much higher than the difference or slip frequency because of the auxiliary frequency component $\omega_C$. As a result an inexpensive and simple filter 65 may be utilized to remove the sum frequency component with a relatively small phase shift of the filtered signal. This increases the accuracy of the control apparatus in supplying the field excitation for the A.C. machine 10.

Referring now to FIG. 3, there is shown a modification of the apparatus of FIG. 2 in which a frequency changer 70 of the electronic modulator type is coupled between an electronic auxiliary frequency signal generator 72, the source of control signals (transmission line 15) and the field windings 52 of the frequency converter 50. The auxiliary frequency signal generator 72 may be a conventional oscillator for providing an A.C. output signal preferably in the form of a square wave. The frequency changer or modulator 70 is of the phase sensitive type and serves to obtain the algebraic sum of the source signal frequency $\omega_S$ and the auxiliary frequency $\omega_C$. Thus the output of the frequency changer 70 is an amplitude unmodulated signal (preferably a sine wave) having a frequency $\omega_C + \omega_S$. This output signal may be filtered to remove undesired frequencies. The output of the frequency changer 70 which is polyphase is fed to the field windings 52 of the frequency converter 50. The frequency converter subtracts the rotational frequency $\omega_R$ (representative of the speed of the A.C. machine) from the rotating magnetic field set up in the field windings. The output from the armature 53 of the frequency converter 50 is the second command signal (two phase) and has a frequency $\omega_2$ which equals the difference of the frequency applied to the field 52 and the rotational frequency $\omega_R$. In mathematical terms: $\omega_2 = \omega_C + \omega_S - \omega_R$. The output of the frequency converter 50 is fed to one input of the frequency comparator 56 and a second command signal having a frequency $\omega_C$ is applied to the other input 55 of the frequency comparator 56 through a phase adjustment network 74 as shown. The phase adjustment network 74 controls the time phase relationship of the first command signal and thereby controls the time phase relationship of the excitation or the field current in the A.C. machine 10 relative to voltage in the armature 40 thereof. As a result the phase adjustment network 74 controls the power output of the machine 10 whether it is operating as a motor or a generator.

In FIG. 4 there is illustrated another embodiment of the present invention which is similar to the apparatus of FIG. 2 and provides a servo positioning control system for the A.C. machine 10. In the apparatus of FIG. 4, a control station element 80 and a position measuring element 82 are coupled in cascade with the auxiliary frequency signal from the generator 40 to control the time phase relationship of the signal applied to the field winding 52 of the frequency converter 50. The position measuring element 82 is coupled to the shaft 14 of the A.C. machine 10 through a pair of gears 83 and 84. The control station element 80 and the position measuring element 82 serve to control the time phase relationship between an input and output polyphase signal and may be identical to the A.C. machine 10 but much smaller in size and rating, having a wound rotor, a polyphase field winding and a polyphase armature. The control station element 80 is illustrated with a three phase field winding 85 (input circuit), a three phase armature 86 (output circuit) and an input shaft 81 coupled to the field winding 85. The position measuring element 82 is illustrated with a three phase field winding 87 (input circuit), a three phase armature 88 (output circuit) and an output shaft 90 coupled to the field winding 87 and the gear 84.

In the operation of the apparatus of FIG. 4 the auxiliary frequency signal is shifted in phase by the control station element 80 depending upon the instantaneous position of the input shaft 81. The output signal from the control station element 80 is again phase shifted by the position measuring element 82 so that the output signal from the armature 88 of the position measuring element 82 has a time phase relationship representative of the difference in the positions of the input and output shafts 81 and 90. The output signal from the position measuring element 82 is applied to the field winding 52 of the frequency converter 50 and then to the frequency comparator 56 which provides an output slip frequency that is filtered, amplified and applied to the field windings of the A.C. machine 10 as has been discussed in connection with the apparatus of FIG. 2. The time phase relationship of the slip frequency signals applied to the field windings of the A.C. machine 10 are controlled by the difference in the positions of the shafts 81 and 88. This causes the A.C. machine 10 to drive the output shaft 90 so that it follows the position of the input shaft 81 in a well known manner. If the input shaft 81 is connected to another shaft the output shaft 90 coupled to the A.C. machine 10 will be synchronized with the other shaft. Such a system is generally referred to as a rotational servo system. If the input shaft 81 is connected to the shaft of a separate motor or other prime mover a synchronized drive will result. The control station element 80 may also be controlled in accordance with the translational position of a member to provide a translational servo system.

Various modifications of the apparatus of the present invention will be readily apparent to those skilled in the art. For example, the field windings of the frequency converters and the A.C. machine 10 may be placed on the rotor or the stator structure. The apparatus for producing the auxiliary frequency signal and the first and second command signals may vary for different applications. The auxiliary frequency signal frequency may comprise suitable multiples or ratios of the control signal frequency and the rotational frequency. It is only necessary that each of the first and second command signals include the auxiliary frequency as one component thereof so that the auxiliary frequency will cancel out when the difference frequency is obtained.

The first and second command signals may include various combinations of the control signal frequency and the rotational frequency. For example consider the following equations:

(1)
$$\omega_1 = \omega_C + \omega_S - \omega_R$$
$$\omega_2 = \omega_C$$

or (2)
$$\omega_1 = \omega_C$$
$$\omega_2 = \omega_C - \omega_S + \omega_R$$

or (3)
$$\omega_1 = \omega_C + \omega_S$$
$$\omega_2 = \omega_C + \omega_R$$

or (4)
$$\omega_1 = \omega_C - \omega_R$$
$$\omega_2 = \omega_C - \omega_S$$

or (5)
$$\omega_1 = \omega_C + (a+1)\omega_S + b\omega_R$$
$$\omega_2 = \omega_C + a\omega_S + (b+1)\omega_R$$

Where $a$ and $b$ are constants.

It will be noted that Equation 1 above applies to the apparatus of FIG. 3 and Equation 3 applies to the apparatus of FIG. 2.

Where the auxiliary frequency signal is made up of various combinations of the control signal frequency $\omega_S$ and the rotational frequency $\omega_R$ the following general equation applies.

(6)
$$\omega_1 = a\omega_R + (a+1)\omega_S$$
$$\omega_2 = (a+1)\omega_R + a\omega_S$$

A comparison of Equation 6 with Equations 1–4 previously discussed illustrates that:

For Equation 1:
$$\omega_C = (a+1)\omega_R + a\omega_S$$

For Equation 2:
$$\omega_C = a\omega_R + (a+1)\omega_S$$

For Equation 3:
$$\omega_C = a\omega_R + a\omega_S$$

For Equation 4:
$$\omega_C = (a+1)\omega_R + (a+1)\omega_S$$

It should also be noted that the source of control signals may be connected to the armature of the controlled A.C. machine 10 as is shown in the FIGURES 3 and 4 or a separate source such as an electronic oscillator may be employed to control the speed or output frequency of the machine 10 as shown in FIG. 2.

What is claimed is:

1. In an apparatus for controlling the direction and speed of rotation of the magnetic field for an alternating current machine having an armature and a polyphase field winding the combination which comprises a source of control signals, an auxiliary frequency signal generator, control means coupled between the source of control signals, the auxiliary frequency signal generator and the alternating current machine for producing first and second alternating current amplitude unmodulated command signals having a frequency difference representative of the slip frequency of the alternating current machine, each of the first and second command signals having the auxiliary frequency signal as one component thereof so that the auxiliary frequency signal cancels out when the algebraic difference of the first and second command signals is obtained, means for obtaining the algebraic difference of the first and second command signals to provide a polyphase slip frequency signal and means for applying the polyphase slip frequency signal to the field windings of the alternating current machine.

2. The combination as defined in claim 1 including a control station element for controlling the time phase relationship of one of the first and second command signals and a position measuring element having an output shaft coupled to the alternating current machine for controlling the time phase relationship of one of the first and second command signals in accordance with the instantaneous position of the output shaft thereof so that the position of the output shaft is controlled in accordance with the time phase relationship of one of the first and second command signals affected by the control station element.

3. The combination as defined in claim 2 wherein the control station element includes an input shaft the instantaneous position of which controls the time phase relationship of one of the first and second command signals whereby the output shaft of the position measuring element will be driven by the alternating current machine until the position of the output shaft corresponds to the position of the input shaft of the control station element.

4. The combination as defined in claim 3 wherein each of the control station and position measuring elements includes a wound rotor induction machine having a polyphase field winding and polyphase armature.

5. In an apparatus for controlling the direction and speed of rotation of the magnetic field for an alternating current machine having an armature and a polyphase field winding the combination which comprises a source of control signals having a frequency representative of the frequency of the current in the armature of the alternating current machine, means for producing an auxiliary frequency signal having a frequency relatively high compared to the frequency of the control signals, control means coupled between the source of control signals, the means for producing the auxiliary frequency signal and responsive to the speed of the alternating current machine for producing first and second alternating current amplitude unmodulated command signals wherein the command signals have a frequency difference representative of the slip frequency of the alternating current machine and wherein each of the command signals includes the auxiliary frequency signal as one component thereof so that the auxiliary frequency signal cancels out when the algebraic difference of the command signals is obtained, means for obtaining the algebraic difference of the first and second command signals to provide a polyphase slip frequency signal and means for applying the slip frequency signal to the field windings of the alternating current machine.

6. The combination as defined in claim 5 wherein the means for producing the first and second command signals includes a frequency converter coupled to the alternating current machine.

7. The combination as defined in claim 6 including a phase adjustment means for shifting the time phase relationship of one of the first and second command signals to control the power output of the alternating current machine.

8. The combination as defined in claim 7 including means for controlling the magnitude of one of the first and second command signals to adjust the power factor of the alternating current machine.

9. In an apparatus for controlling the direction and speed of rotation of the magnetic field of an alternating current machine having an armature and a polyphase field winding the combination which comprises an alternating current energizing source connected to the armature of the alternating current machine, an auxiliary frequency signal generator, first frequency converter means coupled to the alternating current machine and to the auxiliary frequency signal generator for producing a first command signal that is representative of the algebraic sum of the auxiliary frequency signal and a signal representative of the speed of the alternating current machine, second frequency converter means coupled to the auxiliary frequency signal generator and to the source of the energizing signals for producing a second command signal representative of the algebraic addition of the auxiliary frequency signal and the energizing source signals, frequency comparator means coupled to the first and second frequency converter means for producing a polyphase output signal which is representative of the slip frequency of the alternating current machine, and means for applying the output signal from the frequency comparator means to the field windings of the alternating current machine.

10. The combination as defined in claim 9 including means for controlling the time phase relationship between the first and second command signals to control the power output of the alternating current machine.

11. The combination as defined in claim 9 wherein the auxiliary frequency signal generator is arranged to produce a three phase auxiliary frequency signal and wherein the first frequency converter means is arranged to convert the three phase signal from the auxiliary frequency signal generator to a two phase output signal.

12. The combination as defined in claim 9 wherein the auxiliary frequency signal generator is arranged to produce a single phase signal in the form of a square wave.

13. An apparatus for controlling the direction and speed of rotation of the magnetic field for an alternating current machine having an armature and a polyphase field winding comprising a source of alternating current control signals, means for producing an auxiliary frequency signal having a frequency that is high compared to the frequency of the control signals, means coupled between the source of control signals, the means for producing the auxiliary frequency signal, and the alternating current machine for producing first and second alternating current amplitude unmodulated command signals having a difference frequency representative of the slip frequency of the alternating current machine, at least one of the first and second command signals being polyphase, each of the first and second command signals having the auxiliary frequency signal as one component thereof so that the auxiliary frequency signal cancels out when the algebraic difference of the first and second command signals is obtained, means for obtaining the algebraic difference of the first and second command signals to provide a polyphase slip frequency signal and means for applying the slip freqeuncy signal to the field windings of the alternating current machine.

14. The combination as defined in claim 13 including means for controlling the time phase relationship between the first and second command signals and means for controlling the amplitude of one of the first and second command signals.

15. An apparatus for controlling the direction and speed of rotation of the magnetic field for an alternating current machine having an armature and a polyphase field winding comprising a source of polyphase control signals having a first frequency, an auxiliary frequency signal generator for producing a polyphase auxiliary frequency signal having a second frequency, a first frequency converter coupled between the alternating current machine and the auxiliary frequency signal generator and responsive to the speed of the alternating current machine for producing a first polyphase command signal having a frequency equal to the sum of the second frequency and a frequency representative of the speed of the alternating current machine, a second frequency converter coupled to the auxiliary frequency signal generator and to the source of control signals for producing a second command signal having a frequency equal to the sum of the first and second frequencies, frequency comparator means coupled to the first and second frequency converters for obtaining the algebraic difference of the first and second command signals to provide the polyphase slip frequency signal and means for applying the polyphase slip frequency signal to the field windings of the alternating current machine.

16. The combination as defined in claim 15 including a phase angle adjustment network connected between the auxiliary frequency signal generator and the first frequency converter for controlling the time phase relationship of the auxiliary frequency signal to control the power output of the alternating current machine.

17. An apparatus for controlling the direction and speed of rotation of the magnetic field for an alternating current machine having a shaft, an armature and a polyphase field winding comprising a source of control signals, an auxiliary frequency signal generator having an output, a first frequency converter coupled to the source of control signals and to the auxiliary frequency signal generator for producing a first unmodulated command signal having a frequency equal to the sum of the frequencies of the control signals and the auxiliary frequency signal, a second frequency converter having an input and an output and mechanically coupled to the alternating current machine for rotation therewith, a control station element having an input and an output, a position measuring element having an input and an output, the control station element and the position measuring element being connected in cascade between the output of the carrier signal generator and the input of the second frequency converter, each of the control station and position measuring elements being arranged to control the time phase relationship between the input and output signals thereto, the position measuring element being under the control of the alternating current machine, the second frequency converter being arranged to produce a second unmodulated command signal having a frequency equal to the sum of the frequency of the auxiliary frequency signal and a frequency representative of the rotational velocity of the alternating current machine, a frequency comparator coupled to the first and second frequency converters for obtaining the algebraic difference between the first and second command signals and means for applying the output of the frequency comparator to the field winding of the alternating current machine.

18. The combination as defined in claim 17 wherein each of the control station and position measuring elements includes a wound rotor induction machine having a polyphase field winding and a polyphase armature.

19. The combination as defined in claim 5 wherein the control means produces a first command signal having a frequency representative of the sum of the frequencies of the control and auxiliary frequency signals minus a frequency representative of the speed of the alternating current machine and a second command signal having a frequency representative of the frequency of the auxiliary frequency signal.

No references cited.